INVENTORS.
K. H. WATERS
R. E. JOYNSON, JR
BY
ATTORNEY

Nov. 20, 1962 K. H. WATERS ETAL 3,064,887

DIGITAL TO ANALOG CONVERTER

Filed Dec. 7, 1959

3 Sheets-Sheet 2

INVENTORS.
K. H. WATERS
R. E. JOYNSON, JR.

BY William J. Miller

ATTORNEY

Nov. 20, 1962 K. H. WATERS ETAL 3,064,887

DIGITAL TO ANALOG CONVERTER

Filed Dec. 7, 1959

3 Sheets-Sheet 3

INVENTORS.
K. H. WATERS
R. E. JOYNSON, JR.

BY William J. Miller

ATTORNEY

United States Patent Office 3,064,887

Patented Nov. 20, 1962

3,064,887

DIGITAL TO ANALOG CONVERTER

Kenneth H. Waters and Reuben E. Joynson, Jr., Ponca City, Okla.

Filed Dec. 7, 1959, Ser. No. 857,916
11 Claims. (Cl. 235—61.11)

This invention relates to a digital to analog converter, and in particular, but not by way of limitation, to a system for transforming digital values recorded in the form of holes in a tape into analog potentials whose magnitudes are proportional to the digital numbers represented.

In digital computing devices the results are ordinarily obtained in the form of digital values recorded by use of a suitable numbering system (for example, a binary coded system) in the form of punched cards or tapes. In order to use the resultant digital values achieved by the digital computing machine, the output signals frequently must be decoded and converted into a more usable form. This usable form may consist in a voltage potential whose magnitude is related to the original digital number. The resultant analog value can then be used in the control of operations of various electrical and mechanical devices, and, of course, analog values are necessary for supplying to the input analog computers. The plotting of graphs for visual comparison purposes also requires the points on the graph to be first converted to analog values.

Several devices have been utilized to secure digital to analog conversion. One system, using accurate time input pulses, forms analog conversion of binary signals by utilizing the exponential time delay of an R-C circuit. The precise timing required between the arrival of such pulses from the computer system, plus the required accuracy of the magnitude of the input pulses, which is very critical, limits the use of this system. Another proposed system comprises a ladder network of serially connected T-section resistant networks of pre-selected attenuation loss. Potentials, representing the bits of a digital number, are fed into one leg of the respective T-section network and the attenuating impedance of the ladder network provides an analog potential thereacross, corresponding to the digital number represented.

When digital values are recorded by holes in a tape, the above-mentioned method of converting the digital values requires that the information in the form of the distribution of the holes be first converted to electrical signals. The electrical signals are then properly attenuated and summed to achieve the desired analog value. These processes require relatively expensive equipment.

The present invention contemplates a novel method of converting digital values to analog values by passing a light through a punched tape. Broadly stated, the invention may be defined as a method of converting digital values to analog values when the digital values are represented by the arrangement of a plurality of holes in a record medium, comprising the steps of exposing the record medium to light whereby light rays pass through the holes in the record medium, individually attenuating the light passing through each of said holes in proportion to the portion of the digital value represented by the respective hole, and registering the total attenuated light passing through the said holes which is representative of the analog value.

It is therefore an object of this invention to provide a method of converting digital values expressed in the form of holes in a tape to analog values represented of the digital values.

Another object of this invention is to provide a method of converting digital values to analog values, when said digital values are stored in the form of holes in a tape which will be relatively simpler, less expensive, and more trouble-free than existing methods.

Another object of this invention is to provide a method of converting digital values to analog values, when said digital values are stored in the form of holes in a tape, wherein said method does not require that the digital values be first converted to electrical signals.

Another object of this invention is to provide a device for use in converting digital values to analog values, when said digital values are stored in the form of holes in a tape, whereby consistent accuracy of conversion of said values may be obtained.

Another object of this invention is to provide a control circuit whereby a device for converting digital values to analog values (when said digital values are stored in the form of holes in a tape) may be actuated to render a series of conversions of digital to analog values.

These and other objects, and a better understanding of this invention may be had by referring to the following description and claims taken in conjunction with the attached drawings in which:

Figure 1:
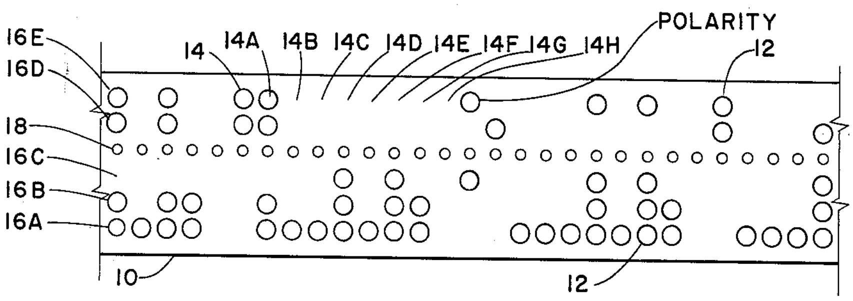
FIGURE 1 is a plan view of a portion of a punched tape.

Referring first to FIG. 1, the numeral 10 designates a typical computing device tape which serves as a record medium. Information is stored on the tape 10 in the form of a multitude of punched holes 12. The holes 12 are grouped in a series of rows 14, arranged perpendicular to the length of tape 10, and several columns or levels 16 arranged parallel to length of the tape 10. Computing device tapes are variously arranged with five, six, seven or eight levels 16, according to the construction of the devices in which they are to be used. In this disclosure a tape 10, having five levels 16, will be used, however, it will be apparent that the principles of the invention can be equally applied to tapes 10 having any arrangements or rows 14 and levels 16. The five level tape 10, as is currently used in industry, has a width of approximately eleven sixteenth of an inch so the FIG. 1 is an enlarged view.

In digital computation, quantities are represented in a binary, or binary coded decimal system. In this system quantities are expressed by the summation of a series of values multiplied by one or zero. This system has been selected and has found universal application since one or zero may be represented physically in the computing device with ease. When binary information is stored on a punched tape 10, the occurrence of a hole 12 in the tape 10 represents a portion of the quantity expressed by an amount of one times the value assigned to the hole 12. The value assigned to the hole 12 will be determined by the arrangement of the format and its position in the format. Ordinarily, four of the five levels 16 of holes are used for recording the digital value. One level 16, termed a digit level 16A, which may be any one of the levels 16 on the tape 10, does not form a part of the digital value, but is utilized as a source of signaling information to the computing machine. Thus the digital information is stored in the tape 10 in levels 16B, 16C, 16D and 16E. A row of sprocket holes 18 is provided in the tape 10 to facilitate aligning the tape 10 through the computing device and to move the tape lengthwise and is not a part of the stored information on the tape 10.

A certain number of rows 14 are assigned to represent each digital value recorded on the tape 10. In this disclosure, seven rows 14, numbered 14A, 14B, 14C, 14D, 14E, 14F and 14G represent a digital value. Thus, in this disclosure the digital value is the summation of the values assigned to twenty-eight holes 12 in the tape 10. Each of these twenty-eight binary digits or bits of information have an assigned value representing a diminishing function of the scale selected. As an example, it will be assumed that a base two has been selected. Thus, the value arrangement of the various bits constituting the digital value may be as follows: Level 16B, row 14A, one-half; level 16C, row 14A, one-fourth; level 16D, row 14A, one-eighth; level 16E, row 14A, one-sixteenth; level 16B, row 14B, one thirty-second; level 16C, row 14B, one sixty-fourth; level 16D, row 14B, one one-hundred twenty-eighth; level 16E, row 14B one two-hundred fifty-sixths; level 16B, row 14C, one five hundred and twelfth, etc., on down to the last bit in the area constituting the digital value which is level 16E, row 14G having the smallest value of any bit in the digital number. Thus, it can be seen that the value of the first digital quantity recorded on tape 10 is as follows: one times $1/2$, plus zero times $1/4$, plus one times $1/8$, plus one times $1/16$, plus zero times $1/32$ plus one times $1/64$, plus one times $1/28$, plus zero times $1/256$ plus one times $1/512$, and so forth, until the full twenty-eight bits of information have been multiplied by the quantity one or zero as indicated by the presence or absence of a hole 12.

This invention consists basically in the process of ascertaining the digital values represented by the stored information in the form of the holes 12 punched in the tape 10 by exposing the tape 10 to a light (wherein the presence of a hole 12 permits light to pass through the hole 12, attenuating the light passing through the holes 12 inversely proportionally to the value assigned to the hole 12, and then accumulating the sum of the attenuated lights passing through the tape 10 in the area representing the digital value and measuring the sum of the light so accumulated to indicate the value represented on the tape.

Figure 2:
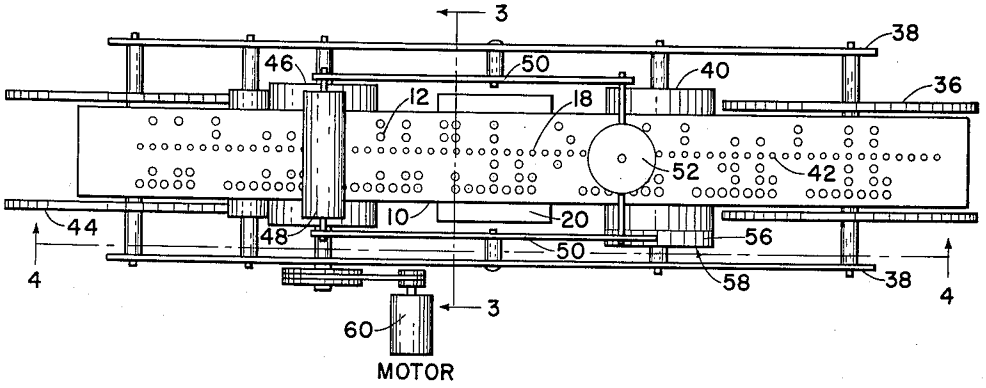
FIGURE 2 is a top view of the converter mechanism, with portions of the apparatus removed to illustrate other details of construction.
Figure 3:
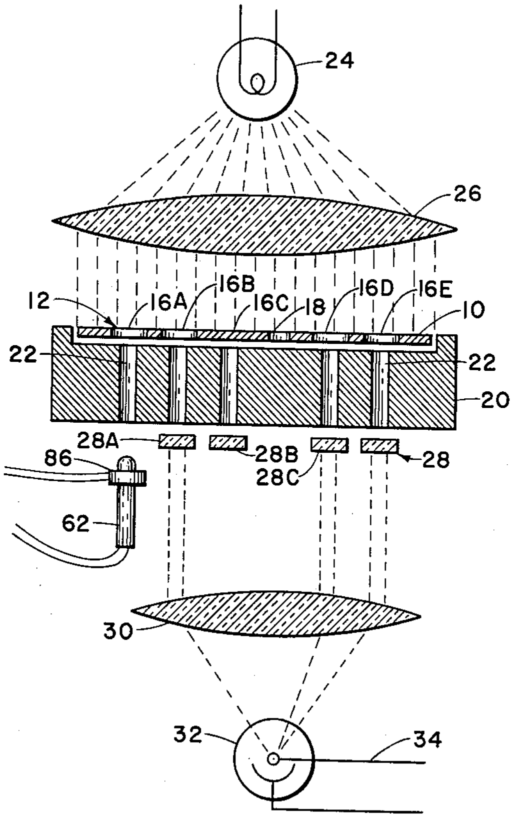
FIGURE 3 is a cross-section taken along the line 3—3 of FIG. 2, with the light source and lens mechanism added, and the control block shown in cross-section.
Figure 4:
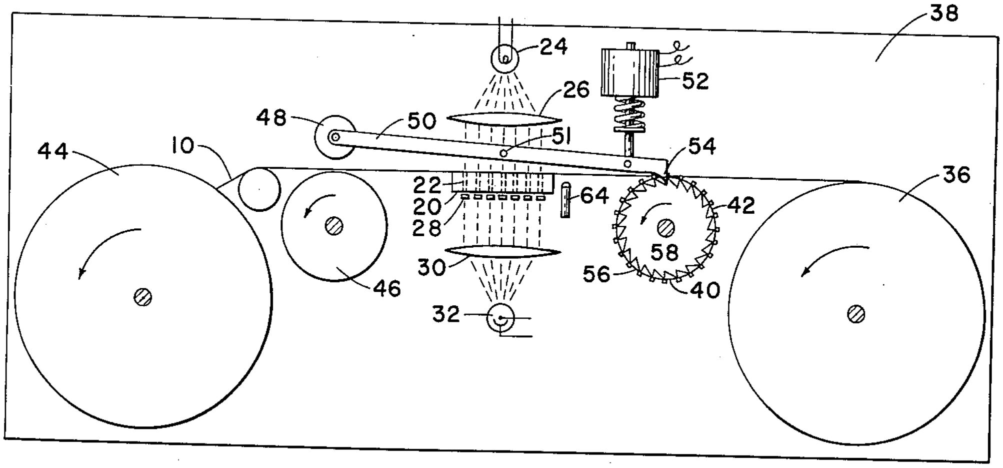
FIGURE 4 is a side view of the converter mechanism shown in FIG. 2.

Referring now to FIG. 2, FIG. 3 and FIG. 4, the mechanism and fundamental process of the invention are best disclosed. Referring first to FIG. 3, tape 10 is passed over a light control block 20, shown in cross-section. Apertures 22 are provided in the light control block 20 corresponding to the rows 14 and the levels 16 of the holes 12 in the tape 10. Thus, apertures 22 are provided in the light control block 20 for the twenty-eight holes 12 representing the bits of information constituting the total digital value recorded in one area on the tape 10.

A light source 24 is positioned above the light control block 20. A lens mechanism 26 is provided between the light source 24 and the light control block 20, whereby the light rays emanating from the light source 24 are collimated to strike the tape 10 over the light control block 20 uniformly and perpendicularly. The cross-section of the light control block 20 is taken along the line of row 14A on the tape 10 shown in FIG. 1. In row 14A, holes 12 appear at level 16A, 16B, 16D and 16E, permitting light to pass through the holes 12 in tape 10 at these positions. The light then passes through the apertures 22 in light control block 20. The light passing through a hole 12 is indicative that the quantity represented by the position of the hole 12, or bit of value, is being multiplied by the number 1. Where a hole 12 does not appear, no light will pass through, which is indicative of the bit of value at this position being multiplied by zero.

The light passing through each hole 12 in the tape 10 will be of equal intensity as it emerges from the light control block 20. However, the value ascribed to each bit position in the tape 10 is different, so that the light, to be indicative of the digital value of the bit portion, must be diminished or attenuated to a value proportional to the value of the bit. To attenuate the light emerging from the apertures 22 in light control block 20, filters 28 (which will be described below) are positioned beneath each aperture 22. The light is attenuated after it emerges from the aperture 22 associated with the respective bit position on the tape 10. Filter 28A positioned below the hole at row 14A, level 16B would be calibrated to permit one-half of the emergent light to pass through. This conforms to the value of one-half assigned to the position of this bit within the digit. Thus, when a hole appears at row 14A, level 16B, the light passing through would be indicative of one times the filtered value of one-half. Filter 28B is positioned at a point beneath row 14A, level 16C. The value assigned to this position in the digit is one-fourth; therefore, filter 28B would be calibrated to permit one-fourth of the light emerging from the light control block 20 to pass through.

In the example shown, since no hole 12 appears at row 14A, level 16C, no light will pass through, representing a multiplication of zero times $1/4$. Filter 28C positioned below row 14A, level 16D, will be calibrated to permit one-eighth of the emergent light to pass through. Since a hole 12 does appear in the tape 10 at row 14A, level 16D, the light passing through filter 28C will be equivalent to the multiplication of one times $1/8$. This procedure is carried out throughout the total twenty-eight positions on the tape 10 which will correspond to twenty-eight apertures 22 in the light control block 20 and twenty-eight filters, each calibrated to attenuate the light passing through it according to the position upon the tape. The summation of the total light passing through the apertures 22 of the light control block 20, as individually attenuated, will correspond to the digital value recorded in the twenty-eight bits of information of the tape 10.

The total light emerging from the filters 28 strikes a receiving lens mechanism 30 where the light is focused onto a photoelectric device 32. Lead wire 34 transmits a voltage from the photoelectric device 32 which represents an analog equivalent of the digital information stored on the tape 10. To facilitate continuous readings of various digital values which are recorded on the tape 10, using the system described, a converter mechanism will next be disclosed.

Referring now to FIG. 4, a carriage reel 36 is rotatably mounted on the frame 38 of the converter. Tape 10 is pulled across the converter mechanism, engaging a sprocket reel 40 having sprocket teeth 42 disposed to protrude into the sprocket holes 18 in the tape 10. A take-up reel 44 is rotatably mounted on the frame 38 to collect the tape 10 after it has passed through the converter. Tape 10 is pulled over the control block 20 by a driver roller 46 which is to be continuously rotated during this operation of the converter. An idler roller 48, rotatably mounted on an idler arm 50 is positioned so that pivoting idler arm 50 about its pivot point 51 will constrain tape 10 to a pressure contact with the rotating driver roller 46 to pull the tape 10 through the converter. Idler arm 50 is pivoted by actuation of a solenoid 52.

Tape 10 must be propelled into its proper position over the light control block 20 and then stopped while the analog reading is taken of the digital value recorded on the seven rows 14 of the digital information. When solenoid 52 is actuated, idler arm 50 is pulled up, pivoting idler roller 48 down to force tape 10 against driver roller 46. This will cause the tape 10 to be pulled over the light control block 20. When the proper position is attained so that a digital value on tape 10 is over the corresponding apertures 22 in light block 20, solenoid 52 will be released, moving idler roller 48 away from the driver roller 46 so that the tape 10 will not be forced to move further.

When the solenoid 52 is released to stop the movement of the tape 10, a pawl 54 on the idler arm 50 engages tapered teeth 56 in a position ratchet 58 affixed to the sprocket reel 40. Solenoid 52 will be released at the appropriate time so that the pawl 54 on the idler arm 50 will encounter the correct teeth 56 to effect a fine position of the tape 10 over the correct apertures 22 in the light control block 20.

FIGURE 2 is a top view of the converter disclosing the tape 10 passing over the light control block 20. Light source 24 and lens mechanism 26, which would be positioned above light control block 20, are not shown in FIG. 2. A driving source 60 is arranged to continually rotate drive roller 46 during operation of the converter.

Various control means are available to start and stop the movement of the tape 10 through the converter and to detect and convey information in addition to the conversion of digital values. One example of such control mechanism is the making and breaking of electrical contacts when a hole 12 occurs in the tape 10. Another method is the use of photocells ,similar to Sylvania Manufacturing Company's number IN77A, which are adaptable to detect the presence of a hole 12 by sensing the passing of light through the hole 12. The use of the photocell for the control mechanism of this device will be utilized, it being understood that other control mechanisms are equally adaptable.

As shown in FIG. 3, control photocells 62 are adapted to detect the presence of a digit or, more accurately, a portion of the information in the tape 10 representing a digit. Seven digit photocells 62 are positioned in conjunction with the light control block 20 to correspond to the seven rows 14 of the digit being read, these photocells being placed at the level 16A of the tape 10. The presence of a hole 12 in level 16A indicates that the row 14, containing the hole 12, is a part of a digit. Through the use of proper control circuitry, which will be explained later, when seven holes 12 appear in sequence over the seven photocells 62 in level 16A, the solenoid 52 will be actuated to stop the tape 10, so that a reading of the digital values can be made by the converter. A row of instruction photocells 64, as shown in FIG. 4 (only one of which is shown) is positioned one row 14 beyond the last row of digital information. The function of these instruction photocells 64 is to detect information not forming a part of a digital value, to apply to the computing device. Thus, when no hole appears in a row at level 16A, proper circuitry indicates that a coded instruction to the computing device will appear on the row of instruction photocells 64.

Figure 5:
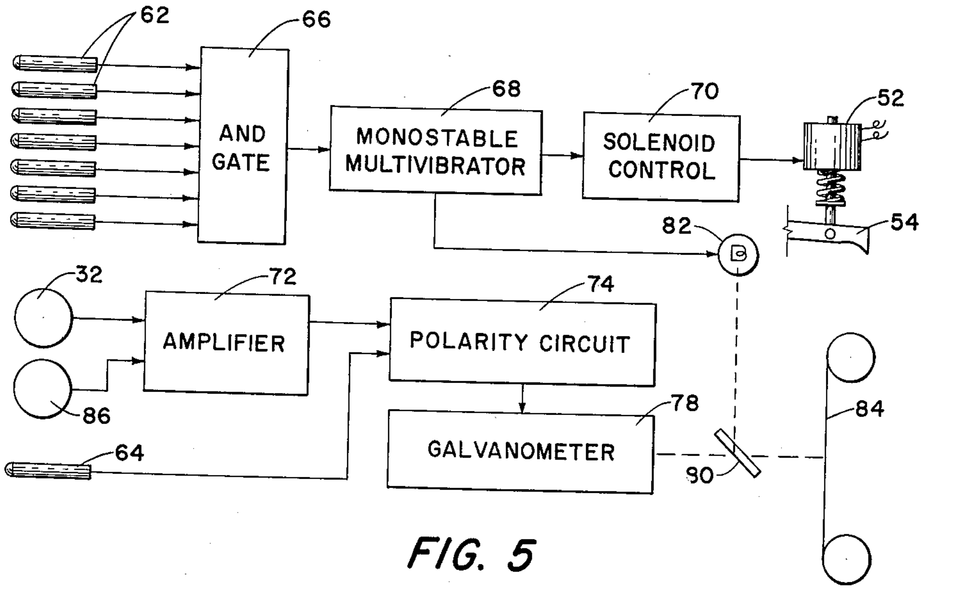
FIGURE 5 is a block diagram of the electrical control circuit of the mechanism.

Referring now to FIG. 5, the control circuitry used to operate the converter is disclosed. The seven digit photocells 62 are connected to an "And" gate 66. When light strikes all of the seven photocells 62, the "And" gate circuit 66 will actuate a monostable multivibrator 68. The monostable multivibrator 68 actuates a solenoid control relay 70, which in turn actuates the solenoid 52, to release the idler arm 50 and the idler roller 48 to stop the tape 10.

Light passing through each hole 12 in the tape 10 and the mating aperture 22 in the light control block 20 is individually attenuated by the respective filter 28, and all of the attenuated light is collected on photoelectric device 32. Voltage generated by photoelectric device 32 is amplified by amplifier 72 and the output signal from the amplifier 72 is fed into a polarity control circuit 74. The polarity control circuit 74 is actuated by a sign photocell 64 which is in the row of instruction photocells 64 adjacent the light control block 20. The sign photocell 64 indicates a positive digital value recorded on the tape 10 when a hole punched in the tape appears above the photocell and signals a negative value when no such hole occurs. It is to be understood, of course, that while the particular apparatus embodied in this specification utilizes only a single photocell 64, it is within the scope of this invention to utilize a pair of photocells, one of which is triggered to indicate a positive value, the other of which is triggered to indicate a negative value. The output from the polarity control circuit 74 represents the analog equivalent of a digital value recorded on the tape 10. This analog value may be utilized in many ways. The example shown incorporates feeding the derived analog value into a galvonometer 78 where the voltage representative of the analog value displaces a pivotable mirror 80. Concurrently with the actuation of the solenoid control relay 70 by the monostable vibrator 68, a light 82 is energized to direct a beam on the mirror 80 of the galvanometer 78. The reflected beam strikes a step driven film 84 where the analog value is recorded.

The tape 10 is then ready to be moved to the next digital position. This movement to the next position is accomplished by the monostable multivibrator 68 returning to a stable condition, causing the solenoid control relay 70 to release the solenoid 52, starting the tape 10. Thus, the tape will advance until seven digit holes 12 in level 16A again appear over the seven digit photocells 62 and the cycle will be repeated, converting the stored digital information into analog information.

The quantity of light passing through the holes 12 in the tape 10 will vary according to the diameter of the holes 12. Since it would be particularly difficult to accurately control the diameters of the holes 12 being punched in the tape 10, any variation which would tend to vitiate the accuracy of the converter may be eliminated by providing the apertures 22 in the light control block 20 with a smaller diameter than the holes 12 in the tape 10. Therefore, slight variations in the sizes of the holes 12 will not affect the amount of light passing through the apertures 22, and the accuracy of the system will be maintained.

It can be seen that the accuracy of the system is predicated upon a consistent intensity of illumination emanating from the light source 24. If the intensity of illumination varies, the output of the photoelectric device 32 will vary for the same digital value in the tape 10. To eliminate this source of error, a light intensity photocell 86 is positioned below the light control block 20 to receive a portion of the light passing through one of the digit holes of level 16A of the tape 10. The output voltage of the light intensity photocell 86 is fed into amplifier 72 as an inverse bias voltage, so that automatic compensation is obtained, whereby the output of amplifier 72 will be the same for the same digital value on the tape 10, regardless of fluctuations in the intensity of the light source 24.

Individual filters 28 are shown as a means of attenuating the light emerging from the apertures 22 in the light control block 20. These filters 28 may be composed of any medium wherein the degree of transparency may be varied. The degree of transparency may be varied by altering the thickness of the medium, or by varying the coefficient of transparency, or by a combination of both methods.

One means of providing the filters 28 is achieved as follows: An unexposed photographic film is positioned beneath the light control block 20. Apertures 22 are then subjected individually to a controlled amount of light to expose the film below the apertures 22. As an example, the apertures 22 corresponding to row 14A, level 16B in the tape 10 would be exposed for ½ of a unit of time. Aperture 22 corresponding to row 14A, level 16C would be exposed for ¼ of a unit of time. Apertures 22 corresponding to row 14A, level 16D would be exposed for ⅛ of a unit of time and so forth. If all of the exposures are within limits of the linear response of the film, the film, when developed, will provide a negative having a degree of transparency beneath each aperture 22 corresponding to the value associated with the position of the respective aperture in the digit. The negative of the film so exposed will serve as a medium to individually attenuate the light emerging from the light control block 20 during the conversion process.

Figure 6:
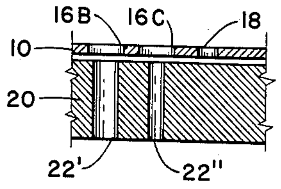
FIGURE 6 is a view similar to a portion of FIG. 3, illustrating a modified embodiment of this invention.

An alternate system of individually attenuating the light passing through the apertures 22 is illustrated in FIG. 6 and comprises the use of apertures 22′ 22″ etc. in the light control block 20 having varying cross-sectional areas, in lieu of the filters previously described. Thus, the aperture 22′ corresponding to the hole 12 at row 14A, level 16B would have an area of ½ unit, corresponded to an attenuation of ½ of the emerged light. The area of the aperture 22″ corresponding to the hole 12 at row 14A at level 16C would have an area of ¼ unit corresponding to an attenuation of the emergent light to represent the value of the bit at this position in the digit. The areas of the apertures would continue to decrease, representing greater attenuation as the values of the bit positions decrease in relative value as a portion of the total digit.

It should be obvious to those skilled in the art that adequate shielding (while not shown) should be provided for the various photo cells, filters, and lens 30 to provide extraneous light from reaching the various photo cells. Such a shield could be provided by enclosing the lens and filter assembly in a light tight material container or the like.

This invention has been described as it applies to punched tapes, as commonly used in computing devices. However, it can be seen that the invention may be equally adaptable to data stored in any record medium, such as cards, and the invention is adaptable to any desired numbering system which may be used in the record medium.

Although this invention has been described with a certain degree of particularity, it is manifest that many changes may be made in the process and in the details of construction of the disclosed devices, without departing from the spirit or scope of the invention as defined in the following claims.

We claim:

1. Apparatus for converting digital values to analog values when said digital values are represented by the arrangement of a plurality of holes in a record medium, comprising a light source positioned to pass light rays through said holes in said record medium; means for individually attenuating the light passing through each of said holes in said record medium in accordance with the portion of the digital value represented by the respective hole; and means for registering the total quantity of attenuated light, which total quantity is representative of the analog value.

2. The apparatus defined in claim 1 wherein said means for individually attenuating said light passing through each of said holes includes an aperture in alignment with each of said holes in said record medium, whereby said light passing through said holes passes through said apertures, the cross-sectional area of said apertures being varied in accordance with the values represented by the corresponding holes.

3. The apparatus defined in claim 1 wherein said means for individually attenuating said light passing through each of said holes includes a filter in alignment with each of said holes whereby light passing through each of said holes must encounter said filter, the transparency of each of said filters being adjusted in accordance with the values represented by the corresponding holes.

4. A system for converting a digital value represented by the arrangement of a plurality of holes in a record medium to an analog value, comprising a control block having an aperture therein arranged for each possible hole in the record medium, means for aligning the holes in the record medium with corresponding apertures in the control block, light source means positioned to pass light rays through the mating holes and apertures, means for individually attenuating the light passing through each hole and mating aperture in accordance with the portion of the digital value represented by the respective hole, and means for registering the total quantity of attenuated light, which total quantity is representative of the analog value.

5. A system as defined in claim 4 wherein said apertures are of equal cross-sectional area and each of said apertures is smaller in cross-sectional area than the mating hole in the record medium.

6. A system as defined in claim 4 wherein said means for individually attenuating said light comprises a filter positioned in alignment with each aperture and having a transparency corresponding to the value of the portion of the digital value represented by the corresponding hole in the record medium.

7. A system as defined in claim 4 wherein said record medium is superimposed on the control block, said light source means comprises a single light source supported above the record medium, and characterized further to include a collimating lens supported between the light source and the record medium to expose the holes in the record medium to uniform and parallel light rays.

8. A system as defined in claim 7 wherein said registering means includes a photoelectric cell positioned below said control block and attenuating means, and characterized further to include a focusing lens between the attenuating means and photoelectric cell to direct all of the attenuated light to the photoelectric cell.

9. A system as defined in claim 4 wherein the record medium is in the form of an elongated tape, the record medium is superimposed on the control block and has a plurality of digit holes therein indicating the presence of the digital value, said control block having a plurality of digit apertures therein spaced for alignment with said digit holes when the first-mentioned holes are properly positioned with respect to the control block, and said means for aligning the holes in the record medium with apertures in the control block comprises a solenoid controlled drive means carried by the control block for moving the record medium lengthwise over the control block, a photo cell in alignment with each digit aperture and positioned to receive light rays passing through the corresponding digit hole and digit aperture when the record medium is properly positioned on the control block, and circuit means connecting all of said photo cells to the solenoid of the drive means for stopping the movement of the record medium when all of said photo cells are receiving light through the corresponding digit holes and digit apertures.

10. A system as defined in claim 9 wherein said circuit means comprises an "And" gate connected to all of said photo cells, and a monostable multivibrator connecting the "And" circuit to said solenoid.

11. A system as defined in claim 9 wherein said record medium has a plurality of sprocket holes along the length thereof, and said drive means comprises a driver roller frictionally engaging one surface of the record medium, an arm pivotally supported at the medial portion thereof and connected to said solenoid for lowering one end of the arm and raising the opposite end of the arm when the solenoid is de-energized, an idler roller carried by said opposite end of said arm for engaging the opposite surface of the record medium and holding the record medium against the driver roller when the solenoid is energized for moving the record medium lengthwise over the control block, a sprocket rotatably carried by the control block in engagement with said sprocket holes, said sprocket having circumferentially spaced tapered teeth around the periphery thereof, and a tapered pawl on said one end of said arm positioned to move between a pair of said tapered teeth with the solenoid is de-energized to adjust the position of the sprocket and accurately align the various holes in the record medium with the corresponding apertures in the control block.

No references cited.

UNITED STATES PATENT OFFICE

CERTIFICATE OF CORRECTION

Patent No. 3,064,887 November 20, 1962

Kenneth H. Waters et al.

It is hereby certified that error appears in the above numbered patent requiring correction and that the said Letters Patent should read as corrected below.

Column 1, line 69, for "represented" read -- representative --; column 3, line 31, for "1/28" read -- 1/128 --; line 38, for "light (wherein the" read -- light, wherein the --; column 5, line 14, for "drive" read -- driver --; column 8, line 69, for "with" read -- when --.

Signed and sealed this 11th day of June 1963.

(SEAL)
Attest:

ERNEST W. SWIDER
Attesting Officer

DAVID L. LADD
Commissioner of Patents